Dec. 10, 1940.  F. J. TARRIS ET AL  2,224,706
CONTROL SYSTEM ACTUATED BY FLUID PRESSURE
Filed July 1, 1938  2 Sheets-Sheet 1
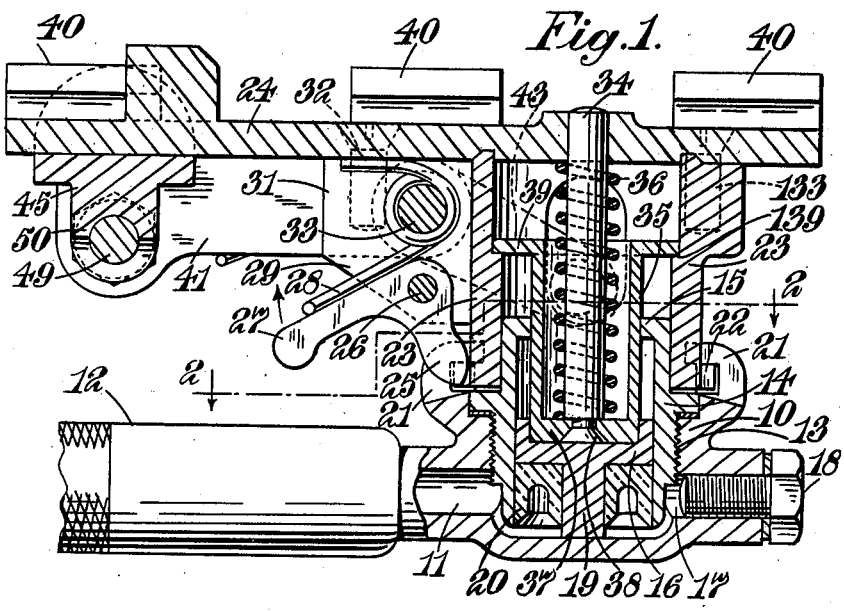
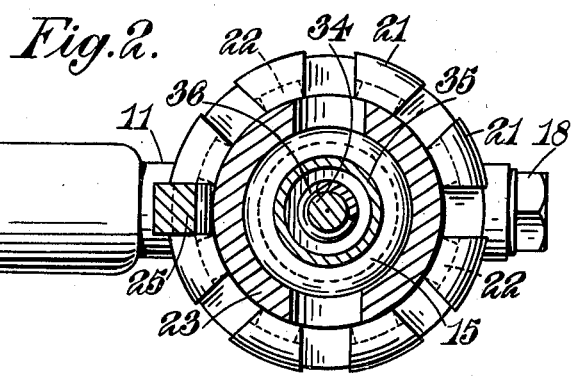
INVENTORS
FREDERICK JOHN TARRIS
and DANIEL WEBB
By Stebbins, Blenko & Parmelee
ATTORNEYS Dec. 10, 1940. F. J. TARRIS ET AL 2,224,706
CONTROL SYSTEM ACTUATED BY FLUID PRESSURE
Filed July 1, 1938 2 Sheets-Sheet 2
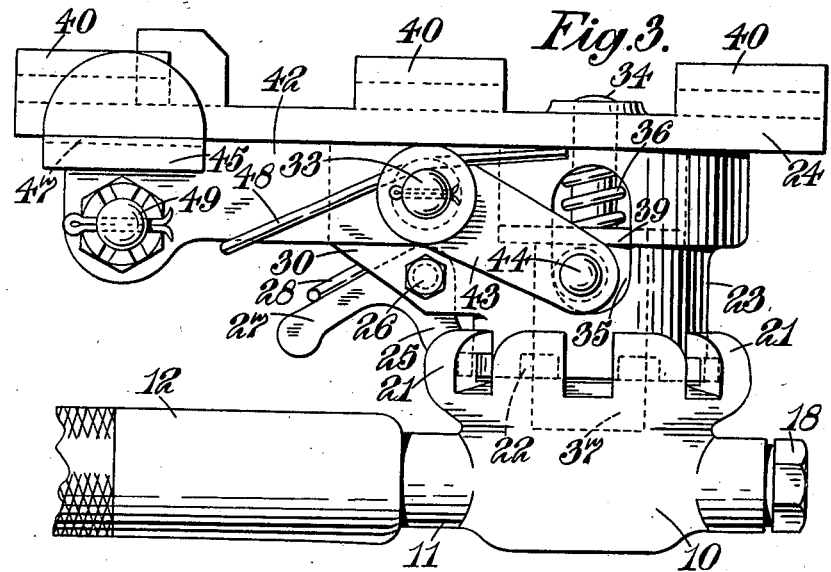
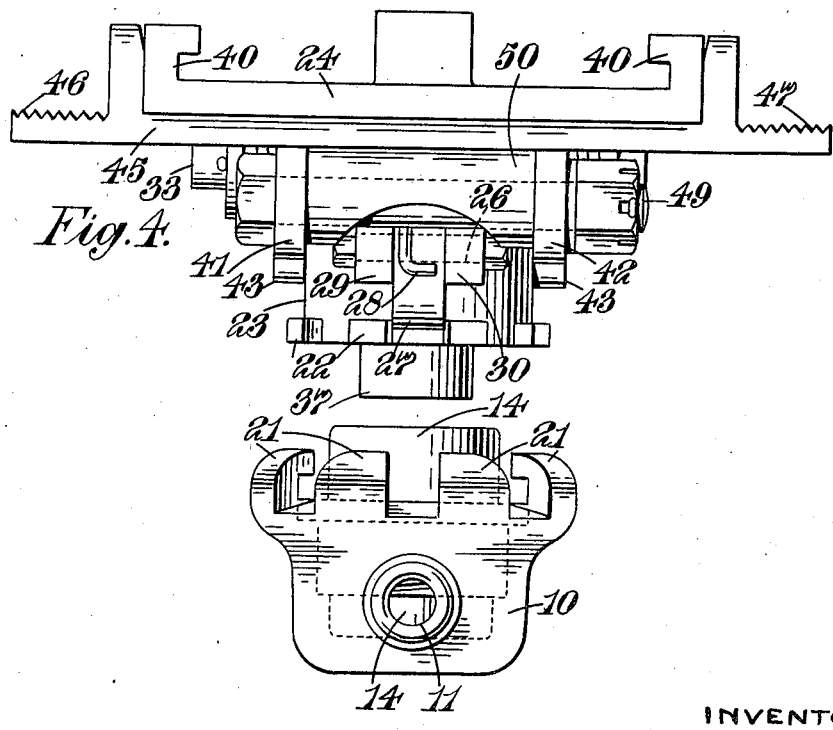
INVENTORS
FREDERICK JOHN TARRIS
and DANIEL WEBB
By Stebbing Blenko & Parmelee
ATTORNEYS Patented Dec. 10, 1940

2,224,706

UNITED STATES PATENT OFFICE 2,224,706

CONTROL SYSTEM ACTUATED BY FLUID PRESSURE

Frederick John Tarris and Daniel Webb, London, England, assignors to The India Rubber, Gutta Percha and Telegraph Works Company Limited, London, England, a British company Application July 1, 1938, Serial No. 217,046
In Great Britain July 8, 1937

3 Claims. (Cl. 89—27)

The present invention comprises improvements in or relating to control systems actuated by fluid pressure, and it is an object of the invention to afford a coupling by means of which a fluid conduit may be readily and conveniently coupled or uncoupled to a device, the regulation of the operation of which by means of the control system of which the conduit forms a part is desired.

According to the invention a disconnectable coupling for connecting a device, the operation of which is intended to be controlled by fluid pressure, to a supply line for the pressure fluid, comprises a pair of interengageable parts one of which has a movable element to actuate the device and the other of which has a member acted upon directly by the pressure fluid for effecting movement of the said element when the two parts are interengaged.

Preferably the part having a member acted upon directly by the pressure fluid is in permanent connection with a pressure fluid supply line.

The invention is to be understood as including also a coupling member for connecting a conduit for pressure fluid to a device, the operation of which is intended to be controlled by means of the pressure fluid, comprising an outer member having formed thereon or secured thereto one or more elements for disconnectably engaging one or more corresponding elements of the device, and a part movably mounted in said outer member to be acted upon directly by the pressure fluid to afford an operative connection with an element of the device controlling its operation when the conduit and device are interconnected.

Preferably in a disconnectable coupling or coupling member as provided by the invention there is provided means to prevent the separation when the coupling is disconnected of the member or part acted upon directly by the pressure fluid from the interengageable part of the coupling or from the coupling member in which it is located.

The coupling member associated with the conduit for pressure fluid conveniently comprises a piston and cylinder of which the piston is subject to the action of pressure fluid in the conduit and of which the cylinder conveniently affords means to limit outward movement of the piston. It will thus be noted that the conduit for pressure fluid and the coupling member associated therewith may be readily disconnected from the device without any leakage of pressure fluid occurring since all parts subject to the direct action of the pressure fluid are included in that coupling member associated with the conduit.

Conveniently the interengaging parts of the coupling are of the "quick-release" type formed to be engaged or disengaged by relative rotation through only a small angle such as 22½°. Preferably the interengaging parts are also capable of being interengaged at any one of a number of positions of relative adjustment in order to meet the requirements of the varying conditions under which it may be desirable to utilise the coupling.

In one specific application of the invention the coupling is employed in conjunction with hydraulic apparatus similar to that described in the specification of co-pending United States application No. 170,710, to operate any auxiliary devices of a vehicle or aircraft in which the apparatus is mounted. A particular auxiliary device in connection with which the present invention may be employed with especial convenience is represented by a machine gun or the like mounted on an aircraft. The coupling may, however, be employed in connection with other auxiliary devices.

In order that the invention may be more clearly understood a preferred form of coupling constructed in accordance with the invention will be described by way of example with reference to the accompanying drawings, in which:

Figure 1 is a central longitudinal section of the coupling with the two parts engaged;

Figure 2 is a sectional view looking in the direction of the arrows on the line 2—2 of Figure 1;

Figure 3 is an external side elevation of the device shown in Figure 1; and

Figure 4 is an end elevation of the coupling as seen from the left of Figures 1 and 3 showing the two parts of the coupling disengaged.

Like reference numerals are employed to denote like parts in the various figures of the drawings.

One part of the coupling shown in the drawings comprises a hollow cap 10 formed with a lateral connection piece 11 secured to a fluid conduit 12 by means of which fluid under pressure is supplied to the coupling. The cap 10 is internally screw-threaded at 13 to receive a lining 14 constituting the walls of a cylinder which have an inwardly turned flange 15 at their outer end to limit the outward movement of a piston 16 mounted for longitudinal movement within the cylinder walls 14. The cap 10 is provided with a bleed hole 17 opposite the connection piece 11, the hole 17 being closed by means of a screw 18. The piston 16 is formed with a central guide 19 around which is located a U-packing 20 to effect a fluid seal between the cylinder walls and the piston, the guide 19 also constituting a stop to limit movement of the piston 16 and U packing 20 relatively to the cap 10 in a direction inwardly of the latter. It will be appreciated that the piston is assembled within the piston walls 14 and this assembly then secured in the hollow screw-threaded cap 10. It will be appreciated further that the piston 16 will be thrust outwardly relatively to the cap 10 under the action of pressure fluid from the conduit 12.

The edge of the cap 10 is formed with a hollow beading 21 having cut-away parts in spaced relation around its circumference so that the beading 21 constitutes in effect a ring of claw-like elements. These claw-like elements forming the beading 21 are intended to interengage with an outwardly turned flange 22 at one end of a cylindrical component 23 into which the cylinder walls 14 may project when such interengagement takes place. The flange 22 has spaced cut-away parts similar to those of the beading 21 so that the interrupted beading 21 and the flange 22 may be moved into positions of relative angular adjustment at which relative longitudinal movement is possible, the claw-like elements of the beading 21 then passing between the projecting elements of the flange 22 through the cut-away parts of the said flange. After such a relative longitudinal movement of approach between the cap 10 and the cylindrical component 23 it is possible for a relative rotational movement to be effected causing the claw-like elements of the interrupted hollow beading 21 to enclose and engage the projecting elements of the interrupted flange 22. The position of engagement is shown in Figures 1 to 3 and the possibility of this engagement, and of a rotational movement followed by a longitudinal movement of separation to secure disengagement, will be apparent from Figure 4 showing the two components of the coupling disengaged from one another.

The cylindrical component 23 is securely mounted on a base 24 to which there is pivotally mounted a spring pressed arm 25 to engage one of the interruptions of both the beading 21 and the flange 22 to prevent relative rotational movement between them when they are interengaged. The arm 25 is carried on a pivot 26 and affords a lever arm 27 which may be operated by hand against the action of a spring 28 in order to release the arm 25 from engagement between the parts of the bead 21 and flange 22. It will be appreciated that due to the interrupted form of the beading 21 and flange 22 the cap 10 and the cylindrical component 23 may be interengaged at any one of a number of positions of relative angular adjustment of these parts according to the number of interruptions formed in the beading 21 and flange 22. The pivot 26 is carried between a pair of projections 29 and 30 carried by a part 31 secured to the base by means of the screw 32 and serving together with the screw 32 to maintain the cylindrical component 23 securely in position on the base 24. The part 31 has a further pivot 33 passing through it and around the central part of which pivot is passed the spring 28 so that its other end abuts the base 24.

Passing through an aperture in the base 24 is a rod 34 guided by the said aperture and passing into an enclosing cylinder 35 between which and the base 24 is located a helical compression spring 36 surrounding the rod 34. The cylinder 35 has a closed end 37 to the inner side of which the end of the rod 34 is secured such as by means of a reduced part 38 of the rod passed through the cylinder end 37 and riveted over. The outer side of the cylinder end 37 is received in a recess in the head of the piston 16 when the cap 10 and the cylindrical component 23 are interengaged the said recess having a diameter substantially equal to or smaller than the inner edges of the flange 15 at the end of the cylinder 14 in which the piston 16 is located. The cylinder 35 may thus be guided to some extent during movement of the piston and such guiding may be assisted also by means of an outwardly turned flange 39 at the other end of the cylinder 35 which flange contacts with the walls of the cylindrical component 23 at a position adjacent the base 24. The flange 39 may also engage a shoulder 139 formed internally of the component 23 to limit movement of the cylinder 35 under pressure from the spring 36 more especially when the coupling members are disengaged.

A movement of the rod 34 under the action of pressure fluid from the conduit 12 acting upon the piston 16 conveniently serves to actuate a trigger mechanism for a machine gun which trigger mechanism is located adjacent the rod 34 when that part of the coupling associated with the base is secured in position by means of the guides 40 upon interengagement of the latter with a corresponding part of the gun.

In case it should be desirable for the gun to be operated by means other than a fluid pressure control system (for example by hand) the pivot 33 carries at its ends disposed on either side of the part 31 a pair of bell crank levers each having arms 41 and 42 extending away from the pivot 33 and the cylindrical component 23 and a pair of arms, of which one only is seen at 43, having an inwardly directed stub 44 at its free end to pass through an aperture in the wall of the cylindrical component 23 and engage the flange 39 of the movable cylinder 35. It will be appreciated that by movement of the lever arms 41 and 42 the arm 43 and a corresponding arm on the opposite side of the device to that shown in Figure 3 will be moved so that their free ends approach the base 24 and by means of the engagement between the stub 44 and the flange 39 will effect an operation of the rod 34 equivalent to that produced by fluid pressure from the conduit 12. Such operation of the bell crank arms is effected by means of a cross-member 45 affording finger grips 46 and 47 which may be depressed by hand. The hand-operated cross-member 45 is normally maintained in an inoperative position by means of a spring 48 having one end abutting the base 24 and the other end turned over to engage the edge of the arm 41 and a similar spring to act on the arm 42. The cross-member 45 is secured to the arms 41 and 42 by means of a pivot 49 passing through the arms 41 and 42 and a sleeve portion 50 formed as part of the cross member 45. It will be noted that the bell crank levers actuated by the member 45 remain stationary during actuation of the device by fluid pressure from the conduit 12.

That part of the coupling associated with the base is normally secured adjacent the gun or other device to be actuated by the coupling and the other part of the coupling is secured to the end of a hydraulic line leading to the gun or other mechanism to be controlled or actuated. It will be noted that when the gun is to be repaired, dismounted or otherwise attended the hydraulic line may be uncoupled merely by effecting release of the two parts of the present coupling member and this release is effected without any leakage from the hydraulic line since the operating piston 16 is removed with that part of the coupling associated with the hydraulic line. After operation of the device, that is to say when hydraulic pressure in the line is released, the compression spring 36 ensures a return movement of the device which return movement in the case of hand operation is ensured also by the spring 48.

We claim:

1. A trigger-operating device for a machine gun comprising a separable two-part coupling one part of which has means for attaching it directly to the gun and has also a trigger-actuating member, and the other part comprises a pressure fluid conduit one end of which terminates in an outlet in the coupling portion of that part, movable means which is associated with the said outlet to prevent escape of pressure fluid therefrom and which is in operative engagement with the trigger-actuating member when the two parts of the device are coupled together, and a hollow cylindrical member which is guided for movement in the first-named coupling part, which projects into the outlet of the second-named coupling part to engage with the movable means therein and which receives within it the trigger-actuating member.

2. A trigger-operating device for a machine gun comprising a separable two-part coupling, one part of which has means for attaching it directly to the gun and also has a trigger-actuating member, and the other part comprises a pressure fluid conduit one end of which terminates in an outlet in the coupling portion in that part, a plunger which serves to close said outlet at all times to prevent escape of pressure fluid and which is mounted in the said outlet to be in operative engagement with the trigger-actuating member when the two parts of the device are coupled together, and a hollow cylinder which is guided for movement in the first-named coupling part and also in the outlet of the second-named coupling part and which is in contact with and is operated by the plunger in the said second-named part and receives within it the trigger-operating member.

3. A trigger-operating device for a machine gun comprising a separable two-part coupling, one part of which has means for attaching it directly to the gun and also has a trigger-actuating member, and the other part comprises a pressure fluid conduit one end of which terminates in an outlet in the coupling portion in that part, a plunger which serves to close said outlet at all times to prevent escape of pressure fluid and which is mounted in the said outlet to be in operative engagement with the trigger-actuating member when the two parts of the device are coupled together, a hollow cylinder which is guided for movement in the first-named coupling part and also in the outlet of the second-named coupling part and which is in contact with and is operated by the plunger in the said second-named part and receives within it the trigger-operating member and a spring associated with the cylindrical member to hold it resiliently in contact with the plunger at all times.

FREDERICK JOHN TARRIS.
DANIEL WEBB.